(12) United States Patent
Fondeur et al.

(10) Patent No.: US 11,181,690 B2
(45) Date of Patent: Nov. 23, 2021

(54) COUPLING BETWEEN A WAVEGUIDE DEVICE AND FIBER STUB

(71) Applicant: Lumentum Operations LLC, Milpitas, CA (US)

(72) Inventors: Barthelemy Fondeur, San Jose, CA (US); Yujian Bao, Shenzhen (CN); Zhaoming Li, Shenzhen (CN); Wei Li, Shenzhen (CN)

(73) Assignee: Lumentum Operations LLC, San Jose, CA (US)

( * ) Notice: Subject to any disclaimer, the term of this patent is extended or adjusted under 35 U.S.C. 154(b) by 0 days.

(21) Appl. No.: 16/457,240

(22) Filed: Jun. 28, 2019

(65) Prior Publication Data

US 2020/0057196 A1 Feb. 20, 2020

(30) Foreign Application Priority Data

Aug. 3, 2018 (WO) ................ PCT/CN2018/098627
Jun. 14, 2019 (WO) ................ PCT/CN2019/091254

(51) Int. Cl.
*G02B 6/12* (2006.01)
*G02B 6/255* (2006.01)
(Continued)

(52) U.S. Cl.
CPC ......... *G02B 6/12019* (2013.01); *G02B 6/255* (2013.01); *G02B 6/421* (2013.01);
(Continued)

(58) Field of Classification Search
CPC ...... G02B 6/12019; G02B 6/30; G02B 6/421; G02B 6/4212; G02B 6/4239
(Continued)

(56) References Cited

U.S. PATENT DOCUMENTS 5,617,495 A * 4/1997 Funabashi .............. G02B 6/421
385/83
5,732,173 A * 3/1998 Bylander ............. G02B 6/1221
385/49
(Continued)

FOREIGN PATENT DOCUMENTS

CN 1102886 A 5/1995
CN 101191875 A 6/2008
(Continued)

OTHER PUBLICATIONS

International Search Report and Written Opinion for Application No. PCT/CN2019/091254, dated Sep. 27, 2019, 10 pages. (Year: 2019).*
(Continued)

*Primary Examiner* — Daniel Petkovsek
(74) *Attorney, Agent, or Firm* — Harrity & Harrity, LLP (57) ABSTRACT

An optical device includes a waveguide device and a fiber stub. The fiber stub at least partially contains a first optical fiber and is directly attached to the waveguide device by an adhesive. The first optical fiber is to be coupled to a second optical fiber included in an optical connector when the optical connector is inserted into a receptacle of the optical device. The fiber stub is to couple the first optical fiber to at least one of the waveguide device or an optical waveguide included in the waveguide device.

20 Claims, 4 Drawing Sheets

(51) Int. Cl.
  *G02B 6/42* (2006.01)
  *H04B 10/25* (2013.01)

(52) U.S. Cl.
  CPC ........... *G02B 6/428* (2013.01); *G02B 6/4212* (2013.01); *G02B 6/4237* (2013.01); *H04B 10/25* (2013.01)

(58) Field of Classification Search
  USPC ........................................................ 385/49
  See application file for complete search history.

(56) References Cited

U.S. PATENT DOCUMENTS

| | | | | |
|---|---|---|---|---|
| 6,296,400 | B1* | 10/2001 | Uchiyama | G02B 6/4292 |
| | | | | 385/92 |
| 7,171,066 | B1* | 1/2007 | Sakai | G02B 6/4204 |
| | | | | 385/14 |
| 7,241,059 | B2* | 7/2007 | Yoshikawa | G02B 6/4292 |
| | | | | 385/49 |
| 9,322,994 | B2* | 4/2016 | Brooks | G02B 6/4292 |
| 9,557,492 | B2* | 1/2017 | Park | G02B 6/4292 |
| 9,921,378 | B2* | 3/2018 | Pfnuer | G02B 6/4268 |
| 10,295,749 | B1* | 5/2019 | Janta-Polczynski | ......................... |
| | | | | G02B 6/4239 |
| 2003/0210866 | A1* | 11/2003 | Kuhara | G02B 6/4246 |
| | | | | 385/49 |
| 2015/0012843 | A1 | 1/2015 | Ouyang et al. | |
| 2019/0285804 | A1* | 9/2019 | Ramachandran | G02B 6/421 |

FOREIGN PATENT DOCUMENTS

| | | |
|---|---|---|
| CN | 101523263 A | 9/2009 |
| CN | 202583507 U | 12/2012 |
| CN | 103052901 A | 4/2013 |
| CN | 103901546 A | 7/2014 |
| CN | 104204882 A | 12/2014 |
| JP | 2002357736 A | 12/2002 |
| KR | 20090063440 A | 6/2009 |

OTHER PUBLICATIONS

International Search Report and Written Opinion for Application No. PCT/CN2018/098627, dated May 9, 2019, 10 pages.

* cited by examiner

FIG. 4

COUPLING BETWEEN A WAVEGUIDE DEVICE AND FIBER STUB

RELATED APPLICATION(S)

This application claims the benefit of priority to International Patent Application No. PCT/CN2018/098627, filed on Aug. 3, 2018, and to International Patent Application No. PCT/CN2019/091254, filed on Jun. 14, 2019, the content of which are incorporated by reference herein in its entirety.

TECHNICAL FIELD

The present disclosure relates to optical devices. More particularly, some aspects of the present disclosure relate to coupling between a waveguide device and a fiber stub in an optical device (e.g., a transmit optical subassembly (TOSA), a receive optical subassembly (ROSA), and/or the like).

BACKGROUND

An optical communications system may include a set of optical devices to enable optical communications over optical fibers. For example, a first optical device may include a transmit optical subassembly (TOSA) to provide a beam (e.g., light) and a second optical device may include a receive optical subassembly (ROSA) to receive the beam. In this way, the first optical device may transmit information to the second optical device. In some cases, a single optical device may include multiple optical sub-assemblies. For example, a first optical device may include a first TOSA and a first ROSA, and may be termed a transmit-receive optical subassembly (TROSA), and a second optical device may include a second TOSA and a second ROSA. In this case, a first optical module may provide a first beam to a second optical device, and the second optical device may receive the first beam and provide a second beam to the first optical device. In this way, the first optical device may communicate with the second optical device, and the second optical device may communicate with the first optical device.

An optical device may include a receptacle attached to a housing of the optical device. The receptacle may enable the optical device to be coupled to another component, such as to an optical fiber, to another optical device, and/or the like. An optical device may include a waveguide device to couple light from an optical fiber, inserted into the receptacle, to one or more components included in the optical device, such as a transmit optical subassembly, a receive optical subassembly, and/or the like.

SUMMARY

According to some implementations, an optical device may include a waveguide device and a fiber stub directly attached to the waveguide device by an adhesive. The fiber stub may at least partially contain a first optical fiber that may be coupled to a second optical fiber included in an optical connector when the optical connector is inserted into a receptacle of the optical device. The fiber stub serves the mechanical function of providing a large surface area so the optical fiber can be securely attached to the waveguide device. Light from the optical fiber is coupled to the optical waveguide in the waveguide device.

According to some implementations, an optical device may include a housing, a waveguide device included in the housing, and a fiber stub directly attached to the waveguide device by an adhesive. The fiber stub may at least partially contain a first optical fiber that extends at least partially into the housing. The first optical fiber may be coupled to a second optical fiber included in an optical connector when the optical connector is inserted into a receptacle of the optical device. The fiber stub serves the mechanical function of providing a large surface area so the optical fiber can be securely attached to the waveguide device. Light from the optical fiber is coupled to the optical waveguide in the waveguide device.

According to some implementations, an optical device may include a waveguide device, a fiber stub directly attached to the waveguide by an adhesive, and a fiber extension at least partially contained within the fiber stub. The fiber extension may be coupled to an optical fiber included in an optical connector when the optical connector is inserted into a receptacle of the optical device. The fiber stub may couple the fiber extension to the waveguide device and/or an optical waveguide included in the waveguide device.

DETAILED DESCRIPTION

The following detailed description of example implementations refers to the accompanying drawings. The same reference numbers in different drawings may identify the same or similar elements.

Some optical devices may include one or more components, positioned in an airgap between a waveguide device and optical fiber included in a receptacle, to couple light between the waveguide and the optical fiber. For example, an optical device may include one or more lenses that may direct light from the waveguide to the optical fiber and/or from the optical fiber to the waveguide. The additional components increase the cost of the optical device, increase the cost of manufacturing the optical device, decrease the reliability of the optical device, and/or the like. Moreover, since the waveguide and the optical fiber are spaced apart to permit the one or more lenses to focus light between the waveguide and the optical fiber, the distance between the waveguide and the optical fiber may result in optical loss due to the divergence of light over the distance. Further optical losses are realized due to Fresnel loss for each additional optical surface that is included between the waveguide and the optical fiber.

Some implementations described herein provide optical devices in which a waveguide is directly attached to a fiber stub, which eliminates the use of lenses between the waveguide and optical fiber. The waveguide and fiber stub may be directly attached by an adhesive that may be included in a gap between the waveguide and the fiber stub. Since the distance between the waveguide and fiber stub is decreased relative to the use of lenses, divergence of light traveling between the waveguide and the fiber stub is decreased, which increases the performance and reliability of the optical device. Moreover, this reduces the cost of the optical device and the cost of manufacturing the optical device (e.g., since the optical device includes fewer components, no antireflective coatings are needed on the mating surfaces of the waveguide and the fiber stub, and/or the like).

Figure 1:
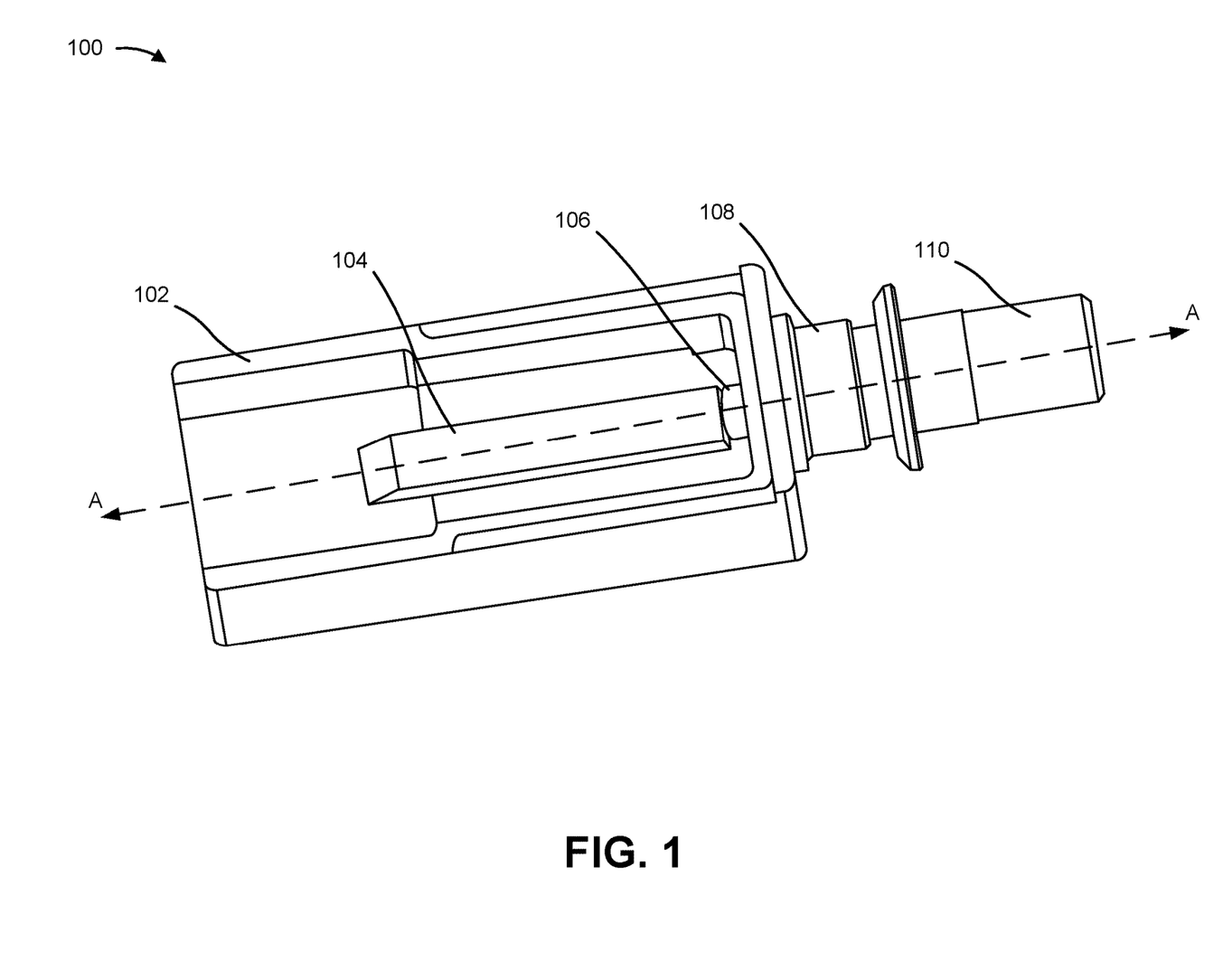
FIG. 1 illustrates a perspective view of an optical device in which a waveguide device is directly attached to a fiber stub.

FIG. 1 illustrates a perspective view of an optical device 100 in which a waveguide device 104 is directly attached to a fiber stub 106. In some implementations, optical device 100 may include a TOSA, a ROSA, a TROSA, and/or another type of optical device. As indicated above, optical device 100 may include a waveguide device 104 and a fiber stub 106. Optical device 100 may further include a housing 102, a sleeve 108, a receptacle 110, and/or the like.

Waveguide device 104 and/or fiber stub 106 may be at least partially or fully contained within housing 102. Housing 102 may further include a cover, a lid, another type of housing component, and/or the like to at least partially or fully enclose waveguide device 104 and/or fiber stub 106 within housing 102.

Waveguide device 104 may be coupled to, and/or attached to, one or more optical subassemblies and/or other components included in housing 102, such as a transmitter subassembly, a receiver subassembly, an optical integrated circuit, an optoelectronic integrated circuit, a driver, a modulator, a processor, a switch, and/or another type of electrical component, optical component, and/or electro-optical component, and/or the like. Waveguide device 104 may include one or more components that are formed of, in, or on an optical glass and/or another type of material that permits light to travel in and/or through waveguide device 104.

In some implementations, waveguide device 104 may include various types of waveguide devices and/or optical waveguides, such as a planar lightwave circuit (PLC) waveguide device, a straight waveguide, a curved waveguide, an arrayed waveguide grating (AWG) device, a Mach-Zehnder waveguide device, and/or the like. In some implementations, each end of waveguide device 104 may be angled (e.g., at various angles, in various planes, and/or the like), squared, and/or the like. In some implementations, waveguide device 104 may be formed of various materials, such as silicon (Si), silicon dioxide (SiO$_2$) indium phosphide (InP), gallium arsenide (GaAs), lithium niobate (LiNbO$_3$), and/or the like.

Waveguide device 104 may be positioned and/or oriented relative to fiber stub 106 such that light is permitted to be coupled between waveguide device 104 and an optical fiber included in fiber stub 106. Moreover, waveguide device 104 may be positioned and/or oriented relative to the one or more optical subassemblies and/or other components included in housing 102 such that light is permitted to be coupled between waveguide device 104 and the one or more optical subassemblies and/or other components.

Fiber stub 106 may include one or more components that serve the mechanical function of providing a large surface area to securely attach the optical fiber, included in fiber stub 106, to waveguide device 104. Light from the optical fiber is coupled to the optical waveguide in waveguide device 104. For example, fiber stub 106 may further include a fiber termination block and an optical fiber. The end of the fiber termination block, that is oriented to attach with waveguide device 104, may be angled (e.g., angled to coincide with an angle of waveguide device 104, or angled differently relative to waveguide device 104), may be squared, and/or the like. The optical fiber may be at least partially or fully contained in a ferrule (208 shown in FIG. 2) at a first end, and may be terminated at or within a fiber termination block at a second, opposing end. For example, the optical fiber may extend entirely through the length of the fiber and may terminate at a distal end of the fiber termination block that is attached to waveguide device 104. The optical fiber may at least partially extend into housing 102 to terminate at the distal end of fiber termination block, which may be at least partially or fully included in housing 102. The fiber termination block may at least partially contain the optical fiber such that the fiber stub 106 is composed of a single unitary material that includes the fiber termination block and the ferrule.

In some implementations, the fiber termination block may be attached to the ferrule. In some implementations, the fiber termination block, and the ferrule may include a single unitary material, and, in combination with the optical fiber, may be referred to as a fiber termination assembly.

Waveguide device 104 may be directly attached to fiber stub 106 such that no optical lenses (e.g., collimation lenses, focusing lenses, and/or the like) are positioned between waveguide device 104 and fiber stub 106. Instead, waveguide device 104 and fiber stub 106 may be mated directly with or without the use of an adhesive, which may be included in a gap between waveguide device 104 and fiber stub 106 to directly attach waveguide device 104 and fiber stub 106. The gap may be, for example, between 1 µm and 50 µm. In some implementations, an antireflective coating may or may not be included on the surfaces of the fiber termination block, the optical fiber, and/or the optical waveguide included in waveguide device 104.

The adhesive may include various types of epoxies and/or other types of adhesives (for example, thermal cure, UV cure and/or the like). In some implementations, the adhesive may be selected such that the refractive index of the adhesive matches a refractive index of fiber stub 106, a refractive index of the optical fiber at least partially contained by fiber stub 106, a refractive index of waveguide device 104, a refractive index of an optical waveguide included in waveguide device 104, and/or the like. In some implementations, the adhesive may be flexible so as to permit thermal expansion and contraction of waveguide device 104 and fiber stub 106, and to prevent the thermal expansion and contraction of waveguide device 104 and fiber stub 106 from causing strain on waveguide device 104, fiber stub 106, and/or other components included in optical device 100.

Sleeve 108 may be formed of various materials, such as a metal, a plastic polymer, and/or the like. Sleeve 108 may be attached to housing 102 using various fabrication techniques. As an example, sleeve 108 may be attached to housing 102 via laser welding. In this case, sleeve 108 may be laser welded to housing 102 at a plurality of welding points. In some implementations, sleeve 108 may be laser welded to housing 102 in a 3×3 configuration (e.g., three groups of welding points, where each group includes three welding points), 3×4, 3×5, and/or the like.

Receptacle 110 may include various types of optical receptacles or optical plugs that may receive an optical connector that includes an optical fiber. Examples of receptacle 110 may include an SC connector receptacle, an LC connector receptacle, an FC connector receptacle, a Multiple-Fiber Push-On/Pull-off (MPO) connector receptacle, a small form-factor pluggable (SFP) connector receptacle, and/or the like. Receptacle 110 may be formed of various materials, such as a metal, a plastic polymer, and/or the like. When an optical connector including an optical fiber is mated with receptacle 110, the optical fiber of the optical connector may extend at least partially into the ferrule and be aligned with fiber stub 106 (e.g., the fiber termination block of fiber stub 106, the optical fiber of fiber stub 106, and/or the like). In this case, the optical fiber of the optical connector may couple to the optical fiber and/or the fiber termination block of fiber stub 106 such that light is permitted to travel between the optical fiber of the optical connector to the one or more optical subassemblies and/or other components via waveguide device 104 and fiber stub 106 (e.g., the optical fiber and/or the fiber termination block of fiber stub 106).

Receptacle 110 may be attached to, and at least partially or fully inserted into, sleeve 108. In some implementations, receptacle 110 may at least partially overlap with sleeve 108 in cases where sleeve 108 is at least partially inserted into receptacle 110. Receptacle 110 may be attached to sleeve 108 using various fabrication techniques. As an example, receptacle 110 may be attached to sleeve 108 via laser welding. In this case, receptacle 110 may be laser welded to sleeve 108 at a plurality of welding points. In some implementations, receptacle 110 may be laser welded to sleeve 108 in a 2×3 configuration (e.g., two groups of welding points, where each group includes three welding points), 3×3, and/or the like.

As indicated above, FIG. 1 is provided as one or more examples. Other examples may differ from what is described with regard to FIG. 1.

Figure 2:
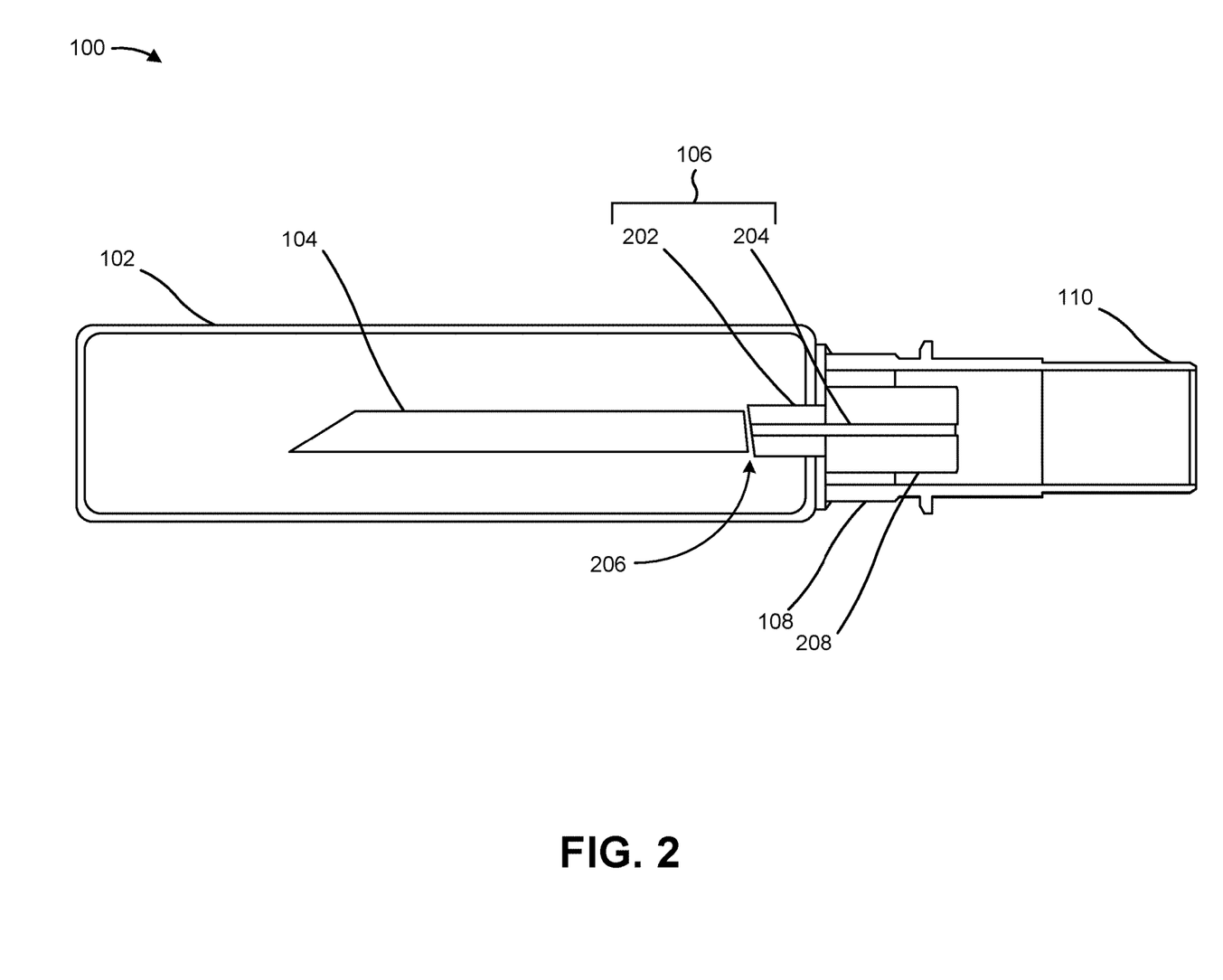
FIG. 2 illustrates a cross-sectional view of the optical device of FIG. 1 along line AA.

FIG. 2 illustrates an example cross-sectional view of optical device 100 of FIG. 1 along line AA illustrated in FIG. 1. Moreover, FIG. 2 illustrates an example in which fiber stub 106 includes a fiber termination block 202 and an optical fiber 204 that is at least partially contained within fiber termination block 202.

As shown in FIG. 2, waveguide device 104 and fiber stub 106 may be aligned and oriented such that light is permitted to travel between another optical fiber (e.g., of an optical connector that is mated with receptacle 110) to one or more optical subassemblies and/or other components (e.g., coupled to waveguide device 104) via waveguide device 104, fiber termination block 202, and optical fiber 204. Waveguide device 104 may be directly attached to fiber termination block 202 by an adhesive that is included in gap 206 between respective ends of waveguide device 104 and fiber termination block 202. Optical fiber 204 may at least partially or fully extend in, and may be at least partially or fully contained within, a ferrule 208 that is positioned at least partially within sleeve 108 and/or receptacle 110. Moreover, optical fiber 204 may extend from a first end of fiber termination block 202 (e.g., the end that is attached to waveguide device 104 in some implementations) to a distal end of fiber ferrule 208 to couple light between the other optical fiber that is included in an optical connector that mates with receptacle 110 and the optical waveguide included in waveguide device 104. In this way, fiber termination block 202 may provide a large surface area so that optical fiber 204 may be more easily and accurately aligned with the optical waveguide included in waveguide device 104 during manufacturing.

Ferrule 208 may be press-fit and/or attached (e.g., via welding, an adhesive that is the same adhesive or a different adhesive that is used to attach waveguide device 104 and fiber stub 106, and/or the like) to sleeve 108 and/or receptacle 110. Fiber stub 106 may be directly attached to ferrule 208. For example, fiber termination block 202 may be directly attached (e.g., via welding, an adhesive that is the same adhesive or a different adhesive that is used to attach waveguide device 104 and fiber stub 106, an adhesive that is the same adhesive or a different adhesive that is used to attach ferrule 208 and sleeve 108 and/or receptacle 110, and/or the like) to an end of ferrule 208, and/or optical fiber 204 may be directly attached (e.g., via welding, an adhesive that is the same adhesive or a different adhesive that is used to attach waveguide device 104 and fiber stub 106, an adhesive that is the same adhesive or a different adhesive that is used to attach ferrule 208 and sleeve 108 and/or receptacle 110, and/or the like) within ferrule 208. Accordingly, optical fiber 204 may at least partially or fully extend and/or be contained in sleeve 108 and/or receptacle 110.

As indicated above, FIG. 2 is provided as one or more examples. Other examples may differ from what is described with regard to FIG. 2.

In this way, optical device 100 includes a waveguide device 104 that is directly attached to a fiber stub 106, which eliminates the use of and/or need for lenses between waveguide device 104 and fiber stub 106. Waveguide device 104 and fiber stub 106 may be directly attached by an adhesive that may be included in a gap 206 between waveguide device 104 and fiber stub 106. The fiber termination block 202 included in fiber stub 106 serves the mechanical function of providing a large surface area so that optical fiber 204, included in fiber stub 106, can be securely attached to waveguide device 104. Light from optical fiber 204 is coupled to the optical waveguide in waveguide device 104. Since the distance between waveguide device 104 and fiber stub 106 is decreased relative to the use of lenses, divergence of light traveling between waveguide device 104 and fiber stub 106 is decreased, which increases the performance and reliability of optical device 100. Moreover, this reduces the cost of optical device 100 and the cost of manufacturing optical device 100 (e.g., since optical device 100 includes fewer components, no antireflective coatings are needed on the mating surfaces of waveguide device 104 and fiber stub 106, and/or the like).

Figure 3:
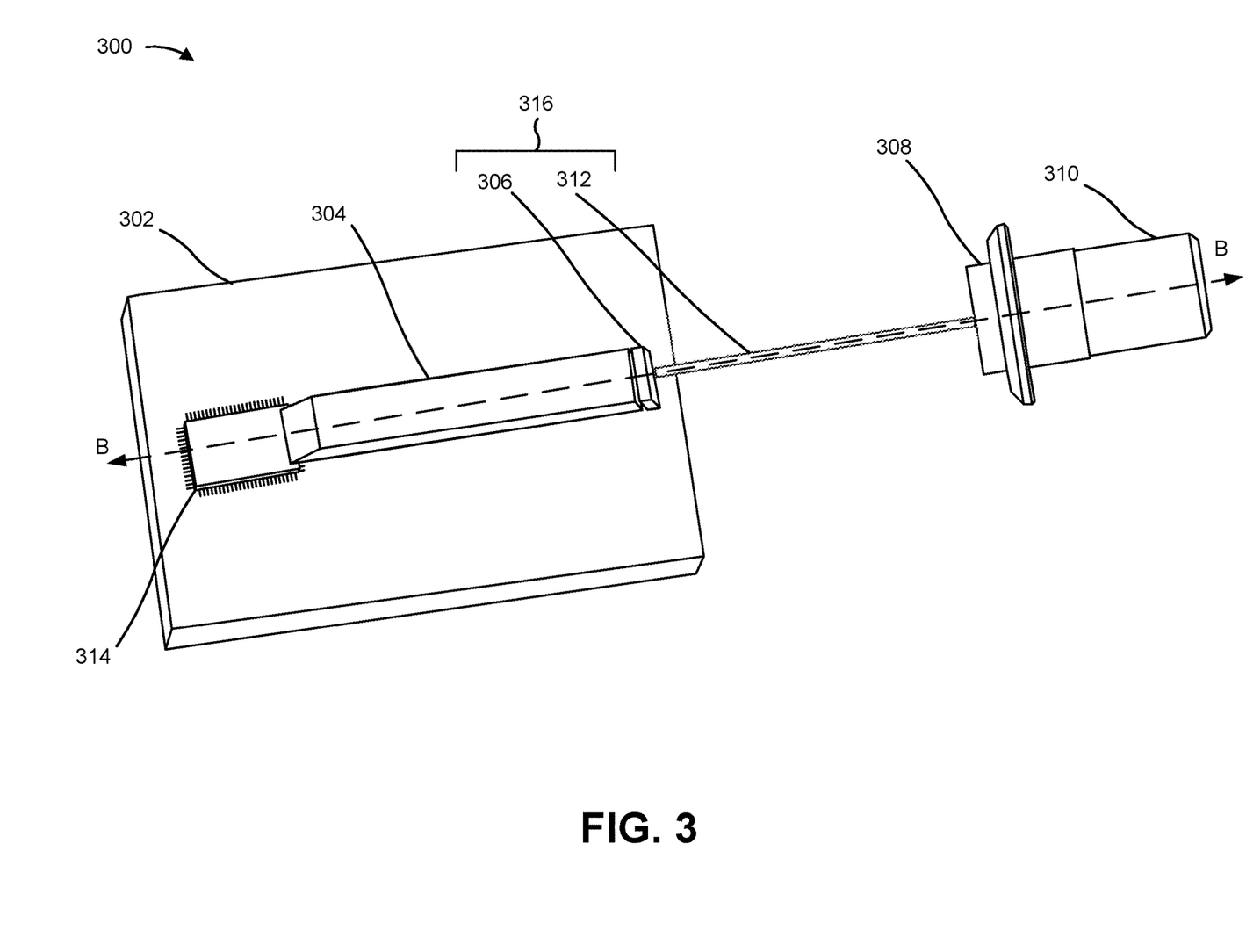
FIG. 3 illustrates a perspective view of another optical device in which the waveguide device is attached to a chip on board (COB).

FIG. 3 illustrates a perspective view of an example optical device 300. In some implementations, optical device 300 may be an example of a chip on board (COB) optical device (e.g., an optical device in which a waveguide device is attached and/or coupled to an optical or optoelectronic or electronic integrated circuit (IC) that is directly mounted to a printed circuit board (PCB)). In some implementations, optical device 300 may include a TOSA, a ROSA, a TROSA, and/or another type of optical device. In some implementations, optical device 300 may be included in a housing. In some implementations, optical device 300 may be included in another device and/or system.

As shown in FIG. 3, optical device 300 may include a printed circuit board (PCB) 302, a waveguide device 304, a fiber stub 316 (which may include a fiber termination block 306 and a fiber extension 312, a sleeve 308, a receptacle 310, an IC 314, and/or the like. As indicated above, optical device 300 may be an example of a chip on board (COB) optical device. In this case, IC 314 may be directly mounted and/or attached to PCB 302. IC 314 may be mounted and/or attached to PCB 302 using various manufacturing techniques. For example, IC 314 may include a die that is cut from a wafer and flip-chip bonded to PCB 302 by a solder reflow process. As another example, IC 314 may be wire-bonded to PCB 302. IC 314 may include one or more optical subassemblies and/or other components, such as a transmitter subassembly, a receiver subassembly, a driver, a modulator, a processor, a switch, and/or another type of electrical component, optical component, and/or electro-optical component, and/or the like.

Waveguide device 304 may be coupled to, and/or attached to, IC 314. Waveguide device 304 may include one or more components that are formed of, in, or on an optical glass and/or another type of material that permits light to travel in and/or through waveguide device 304. In some implementations, waveguide device 304 may include various types of waveguide devices and/or optical waveguides, such as a PLC waveguide device, a straight waveguide, a curved waveguide, an AWG device, a Mach-Zehnder waveguide device, and/or the like. In some implementations, each end of waveguide device 304 may be angled (e.g., at various angles, in various planes, and/or the like), squared, and/or the like. In some implementations, waveguide device 304 may be formed of various materials, such as Si, $SiO_2$, InP, GaAs, $LiNbO_3$, and/or the like.

Waveguide device 304 may be positioned and/or oriented relative to fiber stub 316 such that light is permitted to be coupled between waveguide device 304 and extension fiber 312 included in fiber stub 316. Moreover, waveguide device 304 may be positioned and/or oriented relative to IC 314 such that light is permitted to be coupled between waveguide device 304 and IC 314.

Fiber stub 316 may include one or more components that serve the mechanical function of providing a large surface area to securely attach extension fiber 312, included in fiber stub 316, to waveguide device 304. Light from extension fiber 312 is coupled to the optical waveguide in waveguide device 304. In some implementations, fiber extension 312 may include an extended optical fiber. The end of fiber termination block 306, that is oriented to attach with waveguide device 304, may be angled (e.g., to coincide with an angle of waveguide device 304 or may be angled differently relative to waveguide device 304), may be squared, and/or the like. In some implementations, fiber termination block 306 may at least partially contain fiber extension 312 In this case, extension fiber 312 may extend entirely through the length of fiber termination block 306 and may terminate at the distal end of fiber termination block 306 that is attached to waveguide device 304.

Waveguide device 304 may be directly attached to fiber stub 316 such that no optical lenses (e.g., collimation lenses, focusing lenses, and/or the like) are positioned between waveguide device 304 and fiber stub 316. Instead, waveguide device 304 and fiber stub 316 may be mated directly with or without the use of an adhesive (e.g., that is the same adhesive or a different adhesive that is used to attach fiber termination block 306 and fiber extension 312), which may be included in a gap between waveguide device 304 and fiber stub 316 to directly attach waveguide device 304 and fiber stub 316. The gap may be, for example, between 1 μm and 50 μm. In some implementations, an antireflective coating may or may not be included on the surfaces of fiber termination block 306, extension fiber 312, and/or the optical waveguide included in waveguide device 304.

The adhesive may include various types of epoxies and/or other types of adhesives (for example, thermal cure, UV cure and/or the like). In some implementations, the adhesive may be selected such that the refractive index of the adhesive matches a refractive index of fiber termination block 306, a refractive index of fiber extension 312, a refractive index of waveguide device 304, a refractive index of an optical waveguide included in waveguide device 304, and/or the like. In some implementations, the adhesive may be flexible so as to permit thermal expansion and contraction of waveguide device 304 and fiber stub 316 and to prevent the thermal expansion and contraction of waveguide device 304 and fiber stub 316 from causing strain on waveguide device 304, fiber stub 316, and/or other components included in optical device 300.

Sleeve 308 may be formed of various materials, such as a metal, a plastic polymer, and/or the like. Sleeve 308 may be attached to a housing, an enclosure, and/or another structure in which optical device 300 is included. In this case, the length of fiber extension 312 may be sized such that fiber extension 312 may extend to attach to fiber termination block 306 and the ferrule included in sleeve 308 and/or receptacle 310. Sleeve 308 may be attached to the to the structure in which optical device 300 is included using various fabrication techniques. As an example, sleeve 308 may be attached to the structure in which optical device 300 is included via laser welding. In this case, sleeve 308 may be laser welded to the structure in which optical device 300 is included at a plurality of welding points. In some implementations, sleeve 308 may be laser welded to the structure in which optical device 300 is included in a 3×3 configuration (e.g., three groups of welding points, where each group includes three welding points), 3×4, 3×5, and/or the like.

Receptacle 310 may include various types of optical receptacles or optical plugs that may receive an optical connector that includes an optical fiber. Examples of receptacle 310 may include an SC connector receptacle, an LC connector receptacle, an FC connector receptacle, an MPO connector receptacle, an SFP connector receptacle, and/or the like. Receptacle 310 may be formed of various materials, such as a metal, a plastic polymer, and/or the like. When an optical connector including an optical fiber is mated with receptacle 310, the optical fiber of the optical connector may extend at least partially into the ferrule and aligned with fiber extension 312. In this case, the optical fiber of the optical connector may couple to fiber extension 312 such that light is permitted to travel between the optical fiber of the optical connector to IC 314 via waveguide device 304 and fiber extension 312.

Receptacle 310 may be attached to, and at least partially or fully inserted into, sleeve 308. Receptacle 310 may be attached to sleeve 308 using various fabrication techniques. As an example, receptacle 310 may be attached to sleeve 308 via laser welding. In this case, receptacle 310 may be laser welded to sleeve 308 at a plurality of welding points. In some implementations, receptacle 310 may be laser welded to sleeve 108 in a 2×3 configuration (e.g., two groups of welding points, where each group includes three welding points), 3×3, and/or the like.

As indicated above, FIG. 3 is provided as one or more examples. Other examples may differ from what is described with regard to FIG. 3.

Figure 4:
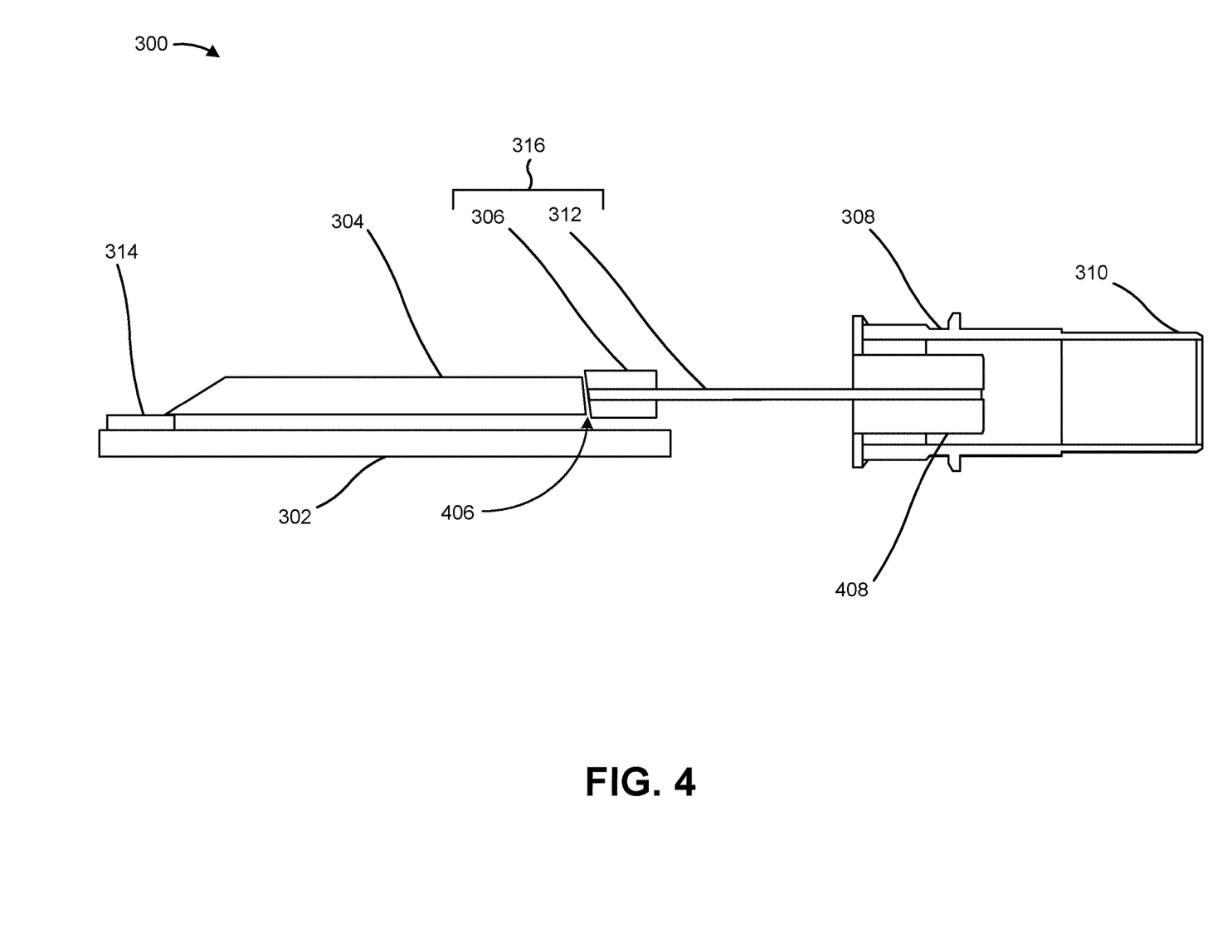
FIG. 4 illustrates a cross-sectional view of the optical device of FIG. 3 along line BB.

FIG. 4 illustrates an example cross-sectional view of optical device 300 of FIG. 3 along line BB illustrated in FIG. 3. As shown in FIG. 4, waveguide device 304 and fiber stub 316 may be aligned and oriented such that light is permitted to travel between an optical fiber (e.g., of an optical connector that is mated with receptacle 310) to IC 314 via waveguide device 304 and fiber extension 312. Waveguide device 304 may be directly attached to fiber stub 316 by an adhesive that is included in gap 406 between respective ends of waveguide device 304 and fiber termination block 306 of fiber stub 316. Fiber extension 312 may at least partially or fully extend in, and may be at least partially or fully contained within, a ferrule 408 that is positioned at least partially within sleeve 308 and/or receptacle 110. Accordingly, fiber extension 312 may at least partially or fully extend and/or be contained in sleeve 308 and/or receptacle 310.

Ferrule 408 may be press-fit and/or attached (e.g., via welding, an adhesive that is the same adhesive or a different adhesive that is used to attach waveguide device 304 and fiber stub 316, an adhesive that is the same adhesive or a different adhesive that is used to attach fiber termination block 306 and fiber extension 312, and/or the like) to sleeve 308 and/or receptacle 310. Fiber extension 312 may be directly attached to ferrule 408. For example, fiber extension 312 may be directly attached (e.g., via welding, an adhesive that is the same adhesive or a different adhesive that is used to attach waveguide device 304 and fiber termination block 306, an adhesive that is the same adhesive or a different adhesive that is used to attach ferrule 408 and sleeve 308 and/or receptacle 310, and/or the like) within ferrule 408.

As indicated above, FIG. 4 is provided as one or more examples. Other examples may differ from what is described with regard to FIG. 4.

In this way, optical device 300 includes a waveguide device 304 that is directly attached to a fiber termination block 306 included in a fiber stub 316, which eliminates the use of lenses between waveguide device 304 and fiber stub 316. Waveguide device 304 and fiber stub 316 may be directly attached by an adhesive that may be included in a gap 406 between waveguide device 304 and fiber termination block 306 of fiber stub 316. Since light travelling from the ferrule end of fiber extension 312 to the waveguide device 304 is contained within fiber extension 312, problems associated with the use of lenses and/or the divergence of light are decreased, which increases the performance and reliability of optical device 300. Moreover, this reduces the cost of optical device 300 and the cost of manufacturing optical device 300 (e.g., since optical device 300 includes fewer components, no antireflective coatings are needed on the mating surfaces of waveguide device 304 and fiber stub 316, and/or the like). In addition, extension fiber 312 may extend from a first end of fiber termination block 306 to a distal end of fiber termination block 306 attached to waveguide device 304 to couple light between an optical fiber included in an optical connector that mates with receptacle 310 and the optical waveguide included in waveguide device 304. In this way, fiber termination block 306 may provide a large surface area so that extension fiber 312 may be more easily and accurately aligned with the optical waveguide included in waveguide device 304 during manufacturing.

The foregoing disclosure provides illustration and description, but is not intended to be exhaustive or to limit the implementations to the precise forms disclosed. Modifications and variations may be made in light of the above disclosure or may be acquired from practice of the implementations.

As used herein, the term "component" is intended to be broadly construed as hardware, firmware, and/or a combination of hardware and software.

It will be apparent that systems and/or methods described herein may be implemented in different forms of hardware, firmware, or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. An optical device, comprising:
 a waveguide device; and
 a fiber stub directly attached to the waveguide device by a flexible adhesive included in a gap separating the fiber stub and the waveguide device,
  wherein the gap separates the fiber stub and the waveguide device by a distance between 1 and 50 microns,
  wherein the fiber stub at least partially contains a first optical fiber that is to be coupled to a second optical fiber, included in an optical connector, when the optical connector is inserted into a receptacle of the optical device,
  wherein the fiber stub is to couple the first optical fiber to at least one of the waveguide device or an optical waveguide included in the waveguide device, and
  wherein the flexible adhesive permits thermal expansion or thermal contraction of at least one of the waveguide device or the fiber stub, and prevents the thermal expansion or the thermal contraction from causing strain on the waveguide device and the fiber stub.

2. The optical device of claim 1, wherein the flexible adhesive is a jelly.

3. The optical device of claim 1, wherein a refractive index of the flexible adhesive matches a refractive index of at least one of the first optical fiber or the optical waveguide.

4. The optical device of claim 1, wherein the waveguide device comprises at least one of:
 a planar lightwave circuit (PLC) waveguide device,
 a straight waveguide,
 a curved waveguide,
 an arrayed waveguide grating (AWG) device, or
 a Mach-Zehnder waveguide device.

5. The optical device of claim 1, further comprising:
 a housing;
 a metal sleeve attached to the housing; and
 the receptacle attached to, and at least partially overlapping with, the metal sleeve.

6. The optical device of claim 5, wherein the receptacle is laser welded to the metal sleeve; and
 wherein the metal sleeve is laser welded to the housing.

7. The optical device of claim 5, further comprising:
 a ferrule positioned at least partially within the receptacle,
 wherein the fiber stub is directly attached to the ferrule, and
 wherein the first optical fiber is at least partially contained within the fiber stub and the ferrule.

8. An optical device, comprising:
 a housing;
 a waveguide device included in the housing; and a fiber stub directly attached to the waveguide device by a flexible adhesive included in a gap between the fiber stub and the waveguide device,
   wherein a distance between an end of the fiber stub and an end of the waveguide device, inclusive of the gap, is greater than 1 micron and less than 50 microns,
   wherein the fiber stub at least partially contains a first optical fiber that extends at least partially into the housing,
   wherein the first optical fiber is coupled to a second optical fiber included in an optical connector when the optical connector is inserted into a receptacle of the optical device,
   wherein the fiber stub is to couple the first optical fiber to at least one of the waveguide device or an optical waveguide included in the waveguide device, and
   wherein the flexible adhesive permits thermal expansion or thermal contraction of at least one of the waveguide device or the fiber stub, and prevents the thermal expansion or the thermal contraction from causing strain on the waveguide device and the fiber stub.

9. The optical device of claim 8, further comprising:
the receptacle; and
a sleeve attached to the housing,
   wherein the receptacle is at least partially overlapping with the sleeve, and
   wherein the fiber stub is directly attached to a ferrule that is positioned at least partially within the receptacle.

10. The optical device of claim 9, wherein the receptacle is laser welded to the sleeve; and
wherein the sleeve is laser welded to the housing.

11. The optical device of claim 8,
wherein a refractive index of the flexible adhesive matches a refractive index of at least one of the first optical fiber or the optical waveguide.

12. The optical device of claim 8, further comprising:
an optical or optoelectronic integrated circuit mounted in the housing,
   wherein the waveguide device is coupled to the optical or optoelectronic integrated circuit.

13. An optical device, comprising:
a waveguide device;
a fiber termination block directly attached to the waveguide device by a flexible adhesive included in a gap between the waveguide device and a fiber extension at least partially contained within the fiber termination block,
   wherein a distance from an end of the fiber termination block to an end of the waveguide device, inclusive of the gap, is greater than 1 micron and less than 50 microns,
   wherein the fiber extension is to be coupled to an optical fiber included in an optical connector when the optical connector is inserted into a receptacle of the optical device;
   wherein the fiber termination block is to couple the fiber extension to at least one of the waveguide device or an optical waveguide included in the waveguide device, and
   wherein the flexible adhesive permits thermal expansion or thermal contraction of at least one of the waveguide device or the fiber termination block, and prevents the thermal expansion or the thermal contraction from causing strain on the waveguide device and the fiber termination block.

14. The optical device of claim 13, wherein the flexible adhesive is a jelly.

15. The optical device of claim 13, wherein a refractive index of the flexible adhesive matches a refractive index of at least one of the fiber extension or the optical waveguide.

16. The optical device of claim 13, wherein the waveguide device comprises at least one of:
a planar lightwave circuit (PLC) waveguide device,
a straight waveguide,
a curved waveguide,
an arrayed waveguide grating (AWG) device, or
a Mach-Zehnder waveguide device.

17. The optical device of claim 13, further comprising:
the receptacle,
   wherein the fiber extension extends at least partially into the receptacle.

18. The optical device of claim 17, further comprising:
a ferrule positioned at least partially within the receptacle,
   wherein the fiber termination block is directly attached to the ferrule, and
   wherein the fiber extension is at least partially contained within the fiber termination block and the ferrule.

19. The optical device of claim 18, wherein the fiber termination block is attached to the ferrule with an adhesive.

20. The optical device of claim 13, further comprising:
a printed circuit board (PCB); and
an optical or optoelectronic integrated circuit mounted to the PCB,
   wherein the waveguide device is coupled to the optical or optoelectronic integrated circuit.

* * * * *